United States Patent Office 3,401,142
Patented Sept. 10, 1968

3,401,142
MASS COLORATION OF POLYESTER RESINS
Francis Bowman, Albert Charles Cooper, and Francis Irving, Manchester, England, assignors to Imperial Chemical Industries Limited, London, England, a corporation of Great Britain
No Drawing. Filed Mar. 23, 1966, Ser. No. 536,659
3 Claims. (Cl. 260—40)

ABSTRACT OF THE DISCLOSURE

Process for mass-coloring polyesters by mixing the polyester with an anthraquinone, anthrapyridone, isothiazoloanthrone or phthaloylacridone dyestuff containing from 1–4 anilino or phenylthio groups, each of which is substituted by one or two hydroxyalkylcarbonyl or hydroxyalkoxyalkylcarbonyl groups.

---

This invention relates to a coloration process and more particularly to a process for the mass coloration of synthetic linear polyesters, particularly polyethylene terephthalate.

According to the invention there is provided a process for the mass coloration of synthetic linear polyesters which comprises mixing one or more dyestuffs of the formula:

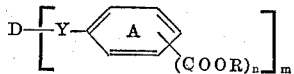

wherein D represents a polycyclic dyestuff radical which contains at least three condensed rings and which is free from sulphonic acid groups;
Y represents —NH— or —S—;
R represents a hydroxyalkyl or hydroxyalkoxyalkyl radical;
$n$ represents a positive integer not exceeding 3,
$m$ represents a positive integer not exceeding 4; and the benzene ring A may be further substituted by chlorine or bromine atoms, with the said polyester and subsequently melting the mixture and shaping it into solid objects.

It is preferred that $n$ represents 1; and that the —COOR group is attached to the benzene ring A in ortho position to the bridging atom or group represented by Y.

The polycyclic dyestuff radical represented by D may be the radical of any polycyclic ring system which is normally present in polycyclic dyestuffs and which contains at least three condensed rings, and preferably from three to eight condensed rings, which can be carbocyclic or heterocyclic rings or a combination of both types. If desired the said polycyclic dyestuff radical can contain further substituents, other than sulphonic acid groups, which are commonly present in such dyestuff radicals, for example chlorine or bromine atoms, carboxylic acid groups, lower alkyl radicals such as the methyl radical, lower alkoxy radicals such as the methoxy radical, hydroxy groups, amino groups, N-lower alkylamino groups such as methylamino, ethylamino, dimethylamino and diethylamino groups, anilino and substituted anilino groups, and acylamino groups such as acylamino groups from lower aliphatic carboxylic acids such as acetylamino and propionylamino groups, or from monocyclic aryl carboxylic acids such as the benzoylamino group. It is however preferred that D represents a 1':9'-anthrapyridone, 1':9'-anthrapyrimidine, isothiazoloanthrone, pyrazoleanthrone, 3':4'-_phthaloylacridone, phthaloylperinone, and, above all, an anthraquinone dyestuff radical.

The dyestuff radical D is attached to the atom or group represented by Y through the carbon atom of an aryl ring, which is preferably a benzene ring, present in D.

The hydroxyalkyl radicals represented by R are preferably mono- or di-hydroxy lower alkyl radicals, wherein lower alkyl denotes alkyl radicals of from 1 to 4 carbon atoms, and as specific examples of such radicals there may be mentioned β-hydroxyethyl, β- or γ-hydroxypropyl, β-hydroxy-n-butyl and β:γ-dihydroxypropyl radicals. The hydroxyalkoxy alkyl radicals represented by R are preferably mono- or di-hydroxy lower alkoxy lower alkyl radicals wherein lower alkoxy denotes alkoxy radicals of from 1 to 4 carbon atoms, and as specific examples of such radicals there may be mentioned β-(β'-hydroxyethoxy)ethyl, β-(β' or γ'-hydroxypropoxy)ethyl, β-(β'-hydroxyethoxy)-n-propyl and γ-(β'-hydroxyethoxy)-n-propyl radicals. It is however preferred that R represents the β-hydroxyethyl radical.

The process of the invention may be conveniently carried out by tumbling, or otherwise mixing, the dyestuff in finely divided form with chips or granules of the said polyester, and subsequently melting the resulting mixture and spinning it into filaments or shaping it into solid objects. If desired the dyestuff can be used in the form of a dispersion in water or some other volatile liquid such as ethanol, or water or some other volatile liquid can be used to moisten the mixture of the dyestuff and the polyester during the tumbling stage, in which case it is preferred to remove the water or volatile liquid, for example by drying, before melting the resulting mixture.

As examples of synthetic linear polyesters which can be coloured by the process of the invention there may be mentioned polyesters which are obtained by the reaction of terephthalic acid or an ester thereof with glycols of the formula HO—$(CH_2)_x$—OH wherein $x$ is an integer of from 2 to 10, or with 1:4-di(hydroxymethyl)cyclohexane. The term synthetic linear polyesters also includes copolyesters based on the said polyesters, such copolyesters being obtained by replacing a portion of the terephthalic acid by another dicarboxylic acid or by a hydroxycarboxylic acid, and/or replacing a portion of the glycol by a different glycol.

The coloured synthetic linear polyesters produced by the process of the invention have good fastness to washing, pressure steaming, acid cross dyeing, perspiration, rubbing after steaming, dry heat treatments such as are used in setting operations, and to light. It is also found that the colorations can be produced in heavy depths of shade, without impairing the properties of the synthetic linear polyesters or fibres derived therefrom.

The dyestuffs used in the process of the invention may themselves be obtained by esterifying the corresponding carboxylic acids of the formula:

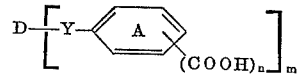

with an alcohol of the formula: R—OH, wherein A, D, Y, $m$, $n$ and R have the meanings stated, or by reacting the corresponding acid chloride of the above carboxylic acids with the said alcohols.

As specific examples of dyestuffs which can be used in the process of the invention there may be mentioned:

The β-hydroxyethyl ester of 1-(o-, m- or p-carboxyanilino)anthraquinone,

The β-hydroxyethyl ester of 1:4-, 1:5- or 1:8-di(o-, m- or p-carboxyanilino)anthraquinone, The β-hydroxyethyl ester of 1:4:5-tri- or 1:4:5:8-tetra-(o-, m- or p-carboxyanilino)anthraquinone, The β-hydroxyethyl ester of 1:4-, 1:5-, or 1:8-di-, 1:4:5-tri- or 1:4:5:8-tetra-(o-, m- or p-carboxyphenylthio)-anthraquinone, and The β-(β'-hydroxyethoxy)ethyl ester of 1:4-, 1:5- or 1:8-di(o-, m- or p-carboxyanilino)anthraquinone.

One preferred class of the dyestuffs for use in the process of the invention comprises the dyestuffs of the formula:

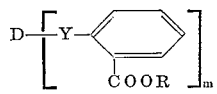

wherein D, R, Y and m have the meanings stated.

A second preferred class of the dyestuffs for use in the process of the invention comprises the dyestuffs of the formula:

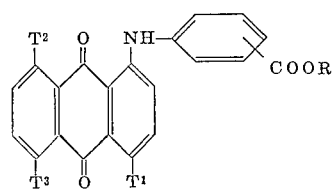

wherein T¹, T² and T³ each independently represent a hydrogen atom or a group of the formula:

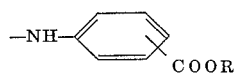

wherein R has the meaning stated. In this class the —COOR group is preferably attached to the benzene ring in ortho position to the imino group. The dyestuffs of this class when used in the process of the invention give red, violet or green shades of excellent fastness properties.

The invention is illustrated but not limited by the following examples in which the parts are by weight.

Example 1

1 part of the β-hydroxyethyl ester of 1-(o-carboxyanilino)anthraquinone in powder form is tumbled with 100 parts of polyethylene terephthalate in the form of chips. The resulting mixture is then melt spun in known manner to produce fibres of a deep scarlet shade and excellent fastness properties.

Example 2

1 part of β-hydroxyethyl ester of 1-(p-carboxyanilino)-4-hydroxyanthraquinone in powder form and 3 parts of β-ethoxyethanol are tumbled with 100 parts of polyethylene terephthalate in the form of small granules until a uniform mixture is obtained. The coloured mixture is dried at 120° C. in a vacuum, and is then melt spun to give fibres of a deep violet shade and excellent fastness properties.

Example 3

1 part of the bis-[β(β'-hydroxyethoxy)ethyl]ester of 1:8-bis(o-carboxyanilino)anthraquinone in finely divided form, 3 parts of water and 100 parts of polyethylene terephthalate in the form of small granules are tumbled together until a uniform mixture is obtained. The mixture is dried at 100° C., and is then melt spun to give bluish-red fibres which possess excellent fastness properties.

The following table gives further examples illustrating the process of the invention which may be carried out by methods similar to those described in Examples 1 to 3 above, but using the dyestuffs listed in the second column of the table. The third column of the table indicates the shades of the resulting polyester fibres.

| Ex. | Dyestuff | Shade |
|---|---|---|
| 4 | β-Hydroxyethyl ester of 1-(m-carboxyanilino)-4-hydroxyanthraquinone. | Reddish-violet. |
| 5 | Bis-(β-hydroxyethyl) ester of 1:4-bis(o-carboxyanilino)anthraquinone. | Green. |
| 6 | β-Hydroxyethyl ester of 6-(o-carboxyanilino)-3':'-phthaloylacridone. | Do. |
| 7 | Bis-(β-hydroxyethyl) ester of 1:5-bis(o-carboxyphenylthio)anthraquinone. | Yellow. |
| 8 | β-Hydroxyethyl ester of 1-(o-carboxyphenylthio)anthraquinone. | Greenish-yellow. |
| 9 | β-Hydroxyethyl ester of 6-(o-carboxyanilino)-3-methyl-1':9'-anthrapyridone. | Carmine. |
| 10 | β-Hydroxyethyl ester of 1-(o-carboxyanilino)-4-benzoylaminoanthraquinone. | Purple. |
| 11 | β:γ-Dihydroxypropyl ester of 1-(0-carboxyanilino)anthraquinone. | Scarlet. |
| 12 | β-Hydroxyethyl ester of 5-(o-carboxyanilino)-1':9'-isothiazoloanthrone. | Reddish-yellow. |
| 13 | β-(β'-hydroxyethoxy) ethyl ester of 6-(o-carboxyanilino)-3-methyl-1':9'-anthrapyridone. | Carmine. |
| 14 | Tetra-(β-hydroxyethyl) ester of 1:4:5:8-tetra-(o-carboxyanilino)anthraquinone. | Green. |
| 15 | Tri-(γ-hydroxypropyl) ester f 1:4:5-tri-(o-carboxyanilino)anthraquinone. | Do. |
| 16 | Tetra-(β-hydroxyethyl) ester of 1:5-bis[2':5'-di(carboxy)anilino]anthraquinone; | Pink. |
| 17 | Bis-(β-hydroxyethyl) ester of 1-benzoylamino-4:5-bis(o-carboxyanilino)-anthraquinone. | Blue. |

What we claim is:

1. Process for the mass coloration of synthetic linear polyesters which comprises mixing at least one dyestuff of the formula:

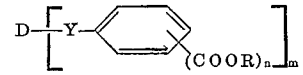

wherein D is a dyestuff radical which is free from sulphonic acid groups and which is selected from the class consisting of anthraquinone, anthrapyridone, isothiazoloanthrone and phthaloylacridone dyestuff radicals;

Y, which is attached to a carbon atom of a benzene ring present in D, is selected from the class consisting of —S— and —NH—;

R is selected from the class consisting of hydroxy lower alkyl wherein the alkyl moiety has from 1–4 carbon atoms and hydroxy lower alkoxy lower alkyl wherein each of the alkoxy and alkyl moieties has from 1–4 carbon atoms;

n is a positive integer from 1 to 2; and m is a positive integer from 1 to 4;

with the said polyester and subsequently melting the mixture and shaping it into solid objects.

2. The process of claim 1 wherein D is an anthraquinone dyestuff radical; Y is —NH—; R is hydroxy lower alkyl radical wherein the alkyl moiety has 1–4 carbon atoms; and n is 1.

3. The process of claim 1 wherein D is an anthraquinone dyestuff radical; Y is —S—; R is hydroxy lower alkyl radical wherein the alkyl moiety has 1–4 carbon atoms; and n is 1.

References Cited

UNITED STATES PATENTS

| 2,955,902 | 10/1960 | Merian | 8—55 |
| 3,036,077 | 5/1962 | Altermatt | 260—40 |
| 3,097,909 | 7/1963 | Rhyner et al. | 260—376 |
| 3,104,233 | 9/1963 | Altermatt | 260—40 |
| 3,228,780 | 1/1966 | Grelat | 260—40 |

FOREIGN PATENTS 891,774  3/1962  Great Britain.

MORRIS LIEBMAN, *Primary Examiner.*

L. T. JACOBS, *Assistant Examiner.*